US007597179B2

(12) United States Patent
Chou

(10) Patent No.: US 7,597,179 B2
(45) Date of Patent: Oct. 6, 2009

(54) SIGNAL RECEIVING MECHANISM

(75) Inventor: Fu-Ming Chou, Taipei (TW)

(73) Assignee: Alfatek Electronics Co., Ltd., Taipei (TW)

( * ) Notice: Subject to any disclaimer, the term of this patent is extended or adjusted under 35 U.S.C. 154(b) by 514 days.

(21) Appl. No.: 11/621,995

(22) Filed: Jan. 11, 2007

(65) Prior Publication Data

US 2008/0142324 A1 Jun. 19, 2008

(30) Foreign Application Priority Data

Oct. 18, 2006 (TW) .............................. 95138452 A

(51) Int. Cl.
*H01Q 1/00* (2006.01)
*G09G 5/00* (2006.01)
(52) U.S. Cl. ................... 191/12.2 R; 343/877; 343/900
(58) Field of Classification Search ................... 191/12, 191/2 R, 12.4, 12.2 A; 439/13, 18, 501; 381/384; 379/438; 242/370, 398, 385.1, 376, 377; 343/877
See application file for complete search history.

(56) References Cited

U.S. PATENT DOCUMENTS

| | | | | |
|---|---|---|---|---|
| 1,904,000 A * | 4/1933 | Hoyt | ........................ | 242/382.4 |
| 2,343,684 A * | 3/1944 | Mace | ........................... | 52/121 |
| 2,496,785 A * | 2/1950 | Finneburgh, Jr. et al. | ... | 191/12.2 R |
| 2,537,481 A * | 1/1951 | Parsons | ....................... | 343/823 |
| 2,543,176 A * | 2/1951 | Komassa | ................. | 242/385.3 |
| 2,565,452 A * | 8/1951 | Johnson et al. | .......... | 242/385.1 |
| 2,623,175 A * | 12/1952 | Finke | ....................... | 242/390.3 |
| 2,645,432 A * | 7/1953 | Griffitts | ....................... | 242/375 |
| 3,201,693 A * | 8/1965 | Vacek et al. | ................. | 375/311 |
| 3,812,307 A * | 5/1974 | Wagner et al. | ............ | 200/52 R |
| 4,323,902 A * | 4/1982 | Hussey et al. | ............... | 343/903 |
| 6,230,860 B1 * | 5/2001 | Wu | ........................ | 191/12.2 R |
| 6,942,079 B2 * | 9/2005 | Chang | ........................ | 191/12.4 |

* cited by examiner

*Primary Examiner*—Mark T Le
(74) *Attorney, Agent, or Firm*—Pai Patent & Trademark Law Firm; Chao-Chang David Pai

(57) ABSTRACT

A signal receiving mechanism includes a cord reel, a cord wound around the cord reel, a signal receiving element assembled to a top of the cord reel, a grounding unit, and a pivot unit for rotatably connecting the cord reel to the grounding unit. The cord reel includes a hollow tubular body having a horizontal inner annular section. The cord includes a first and a second wire, inner ends of which are extended into the hollow tubular body below the inner annular section. The signal receiving element has a lower end downward extended through the inner annular section to electrically connect to the first wire of the cord. The grounding unit includes a first annular conductive plate, which is set at an underside of the inner annular section to electrically connect to the second wire of the cord, and is in contact with a conduction module for grounding.

20 Claims, 4 Drawing Sheets

SIGNAL RECEIVING MECHANISM

RELATED APPLICATIONS

The present application is based on, and claims priority from, Taiwan Application Serial Number 95138452, filed Oct. 18, 2006, the disclosure of which is hereby incorporated by reference herein in its entirety.

FIELD OF THE INVENTION

The present invention relates to a signal receiving mechanism, and more particularly to a signal receiving mechanism that allows a cord thereof to be pulled out and rewound without becoming tangled.

BACKGROUND OF THE INVENTION

A plurality of peripheral apparatus, such as digital signal receiving mechanisms, have been researched and developed in response to the development of digital televisions. On the other hand, the function of receiving digital television signals has been integrated into most electronic apparatus having a dynamic display, such as an in-car display, a personal digital assistant (PDA), a notebook computer, etc.

When a user wants to watch digital television programs, a digital signal receiving mechanism is required to receive digital television signals, and the received signals are transmitted via a cord to the electronic apparatus with the digital television receiving function.

A conventional signal receiving mechanism is usually directly mounted on the electronic apparatus to inevitably spoil the integrity of the appearance of the electronic apparatus. Moreover, the conventional signal receiving mechanism does not allow a user to adjust an overall length of the signal receiving element thereof for the purpose of adjusting a receiving frequency thereof. And, since the conventional signal receiving mechanism is directly mounted on the electronic apparatus, it is impossible to change the position of the signal receiving mechanism in order to obtain good quality of signal received. Further, the signal receiving element of the conventional signal receiving mechanism and the cord connecting the conventional signal receiving mechanism to the electronic apparatus tend to cause inconveniences in storage and carrying of the signal receiving mechanism.

It is therefore tried by the inventor to develop a digital signal receiving mechanism having a length-adjustable signal receiving element to thereby enable adjustment of the receiving frequency thereof, and a cord that is wound around a reel to be freely pulled out and rewound without causing tangling of the cord, so that the signal receiving mechanism has good applicability.

SUMMARY OF THE INVENTION

A primary object of the present invention is to provide a signal receiving mechanism that has a cord wound around a reel to be pulled out and rewound without becoming tangled.

To achieve the above and other objects, the signal receiving mechanism according to the present invention includes a cord reel, a cord, a signal receiving element, a grounding unit, and a pivot unit. The cord reel includes an axially extended hollow tubular body, and an inner annular section located around an inner wall surface of the hollow tubular body. The hollow tubular body is provided on a peripheral wall below the inner annular section with a horizontally extended through opening, and the inner annular section is provided at a predetermined position with a vertically extended passage. The cord includes a first and a second wire, which are different in electric polarity, and is wound around the cord reel with an inner end extended through the through opening into the hollow tubular body to locate below the inner annular section. The signal receiving element is assembled to a top of the inner annular section with a lower end downward extended through the passage formed on the inner annular section to electrically connect to the first wire at the inner end of the cord. The grounding unit includes a first annular conductive plate and a conduction module, which are in contact with each other. The first annular conductive plate is set to an underside of the inner annular section to electrically connect to the second wire at the inner end of the cord. The cord reel and the grounding unit are rotatably connected to the pivot unit, such that the first annular conductive plate along with the cord reel may be rotated relative to the conduction module.

The signal receiving element includes a signal receiving section, a setting section outward extended from a lower end of the signal receiving section, and a contact section extended from an end of the setting section opposite to the signal receiving section. The setting section is set to the top of the inner annular section of the cord reel, and the contact section is downward extended through the passage formed on the inner annular section to electrically connect to the first wire at the inner end of the cord.

More specifically, the signal receiving element includes a locating section, a setting section, a coiled signal receiving section extended between the locating section and the setting section, and a contact section extended from the setting section to locate opposite to the signal receiving section and form the lower end of the signal receiving element. The setting section is fixedly set in a space defined above the inner annular section of the cord reel, and the contact section is downward extended through the passage on the inner annular section to electrically connect to the first wire at the inner end of the cord. The hollow tubular body includes at least one retaining hole formed on the inner wall surface thereof above the inner annular section. The signal receiving element further includes a top unit being connected at a predetermined point to an upper end of the locating section of the signal receiving element, so that the signal receiving section of the signal receiving element is sandwiched between the top unit and the cord reel. The top unit includes at least one retaining catch, which is detachably hooked to the at least one retaining hole by interference fit.

In a preferred embodiment of the present invention, the above-mentioned signal receiving element is a coil spring.

The cord reel further includes two outer annular sections separately horizontally located around an upper and a lower outer wall surface of the hollow tubular body to space from each other, so as to restrict the cord wound around the cord reel from vertically moving out of the cord reel.

The inner annular section on the cord reel is provided on the underside with an annular rabbet, in which the first annular conductive plate of the grounding unit is set.

The conduction module of the grounding unit includes an upper annular limiting wall that is in contact with the first annular conductive plate, a lower annular limiting wall for grounding, and an elastic element located between the upper and the lower annular limiting wall.

The signal receiving mechanism further includes a hollow base located around the cord reel, so that the cord reel and the hollow base together define a cord winding space therebetween. The hollow base is provided on a peripheral wall thereof between the two outer annular sections of the cord reel with a cord passage to communicate the cord winding space with external environment for an outer end of the cord to extend therethrough.

The grounding unit further includes a second annular conductive plate that is located below the hollow base to connect to the pivot unit for grounding. And, while the upper annular limiting wall of the conduction module is in contact with the first annular conductive plate, the lower annular limiting wall is in contact with the second annular conductive plate, and the elastic element is located between the upper and the lower annular limiting wall to normally push against the upper and lower annular limiting walls, so that the upper and the lower annular limiting wall are in effective contact with the first and the second annular conductive plate, respectively.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
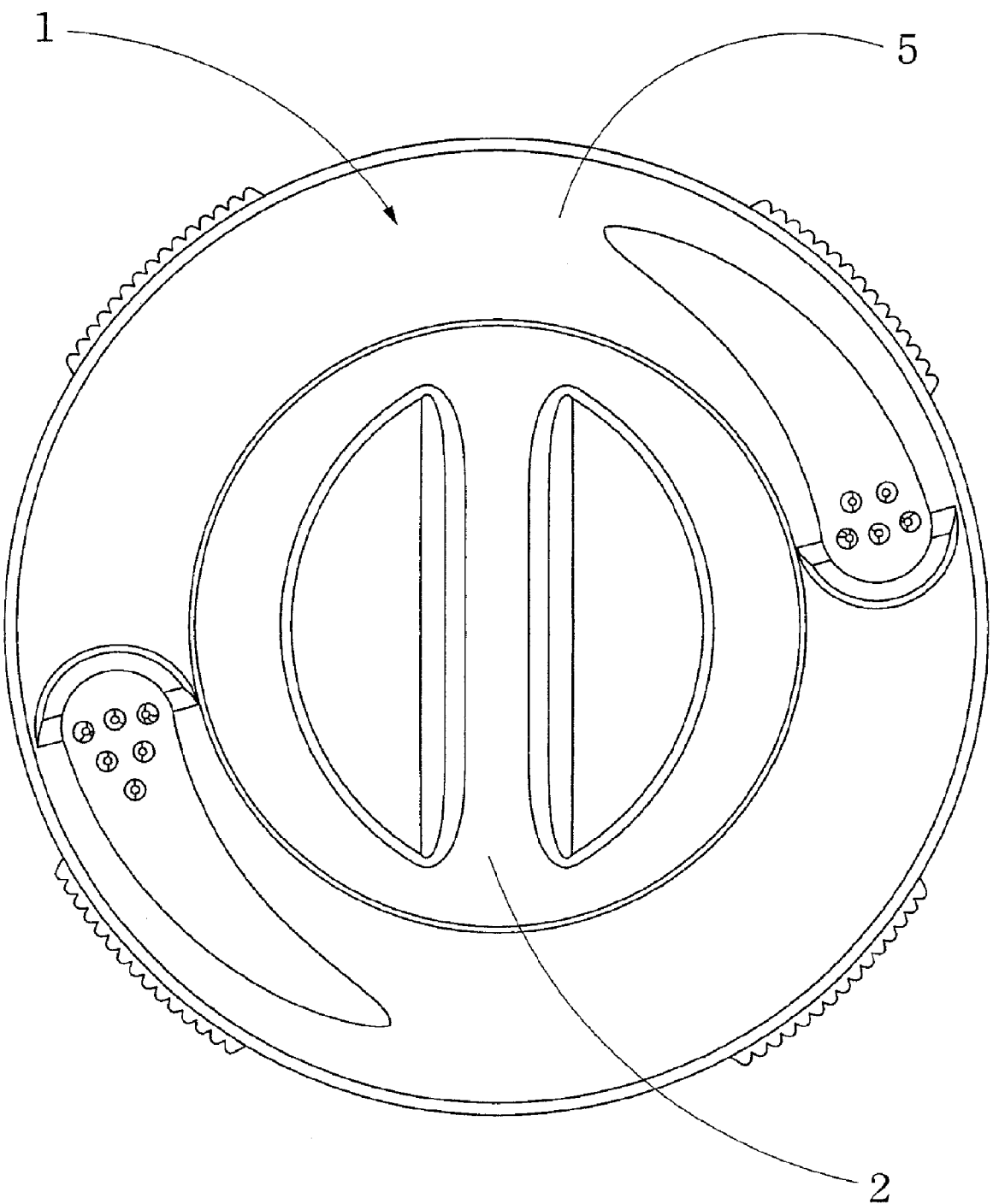
FIG. 1 is an assembled top view of a signal receiving mechanism according to a preferred embodiment of the present invention.
Figure 3:
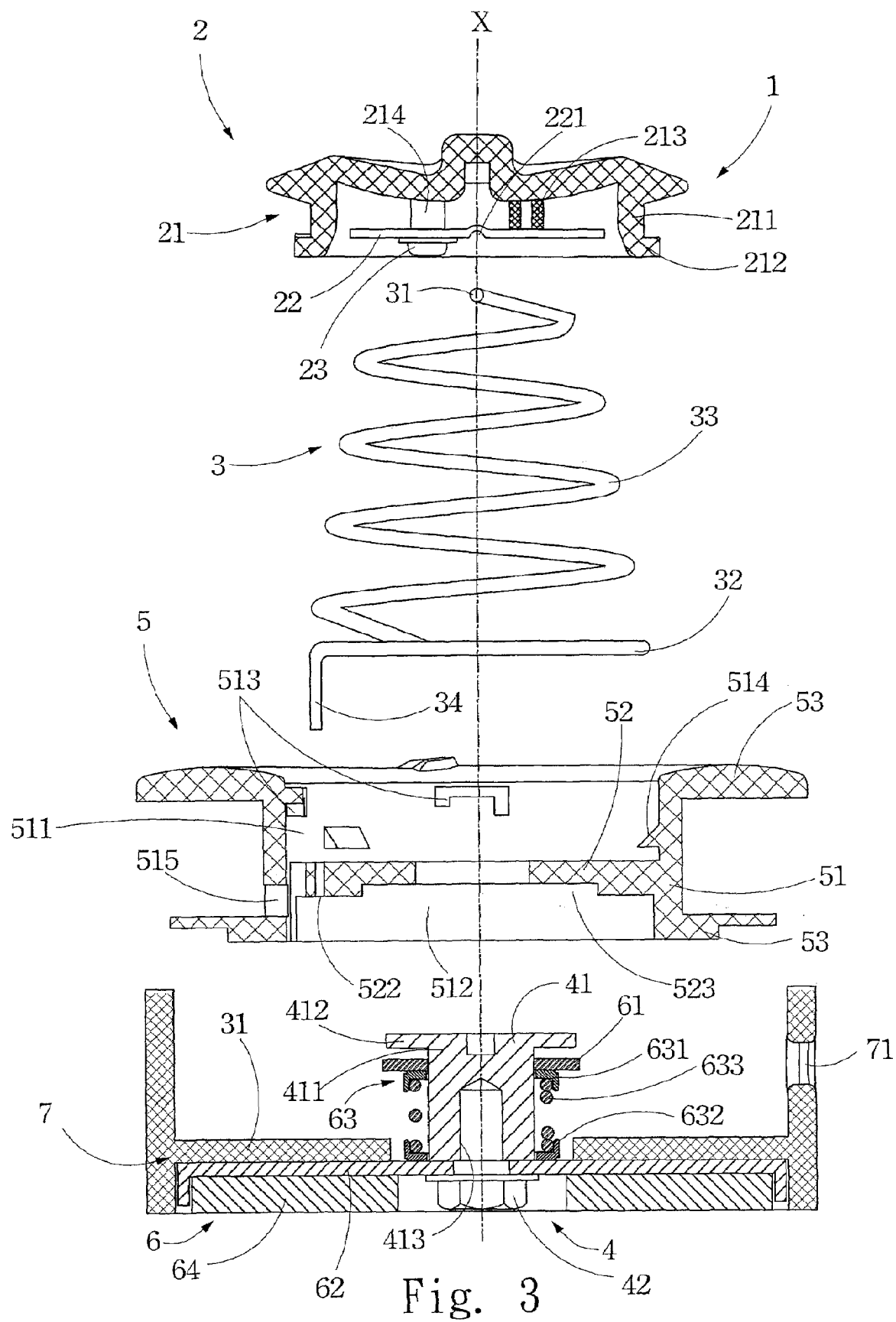
FIG. 3 is an exploded sectional view of the signal receiving mechanism of FIG. 1.
Figure 4:
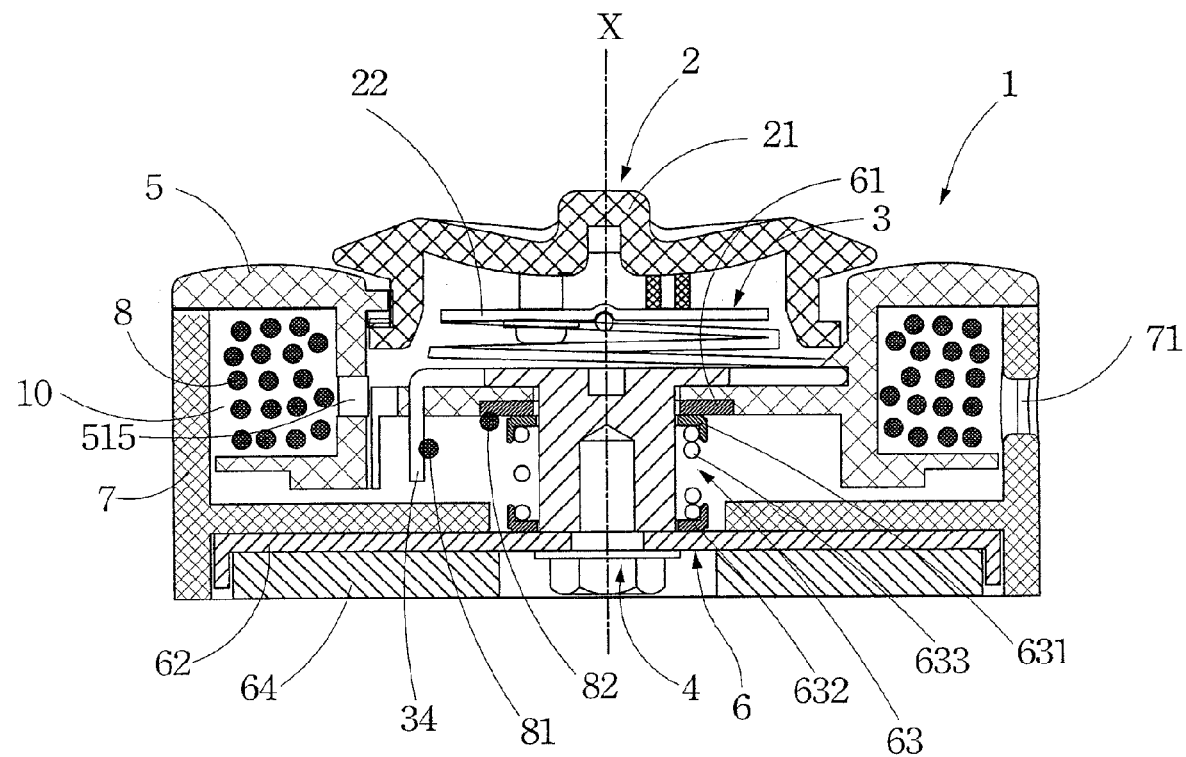
FIG. 4 is another assembled sectional view of the signal receiving mechanism of FIG. 1 with the top unit being held to a top of the cord reel.

Please refer to FIG. 1 that is a top view of a signal receiving mechanism 1 according to a preferred embodiment of the present invention, and to FIGS. 3 and 4 that are exploded and assembled sectional views, respectively, of the signal receiving mechanism 1 of FIG. 1.

The signal receiving mechanism 1 may be electrically connected to an electronic apparatus, such as a computer (not shown) for receiving signals and feeding the received signals to the electronic apparatus. The signals may be digital television signals. As shown, the signal receiving mechanism 1 includes from top to bottom a top unit 2, a signal receiving element 3, a pivot unit 4, a cord reel 5, a grounding unit 6, a hollow base 7, and a cord 8. These parts are arranged about a vertical axis X.

The cord reel 5 includes an axially extended hollow tubular body 51, an inner annular section 52, and two outer annular sections 53. The inner annular section 52 is horizontally located around an inner wall surface of the hollow tubular body 51 to divide an inner space of the hollow tubular body 51 into an upper part 511 and a lower part 512. The two outer annular sections 53 are separately horizontally located around an upper and a lower outer wall surface of the hollow tubular body 51 to space from each other.

The hollow tubular body 51 is provided on the inner wall surface with a plurality of retaining holes 513, a plurality of protrusions 514, and a through opening 515. The retaining holes 513 and the protrusions 514 are integrally formed on and annularly arranged along the inner wall surface in the upper part 511 of the hollow tubular body 51, and are staggered at predetermined intervals. The through opening 515 is horizontally extended through a wall of the hollow tubular body 51 at a position in the lower part 512.

The inner annular section 52 defines a passage 522 extended in a direction parallel to the axis X, and is formed at an underside with an annular rabbet 523.

The top unit 2 is located immediately above the cord reel 5, and includes a top cover 21 and an electrically conductive element 22. The top cover 21 includes an open-bottomed hat-like main body 211, a plurality of retaining catches 212 spaced along a lower outer surface of the main body 211, a vertically downward extended post 213, and an internally threaded hollow post 214. The post 213 and the threaded hollow post 214 are integrally formed at an inner side of the main body 211, and are separated from an inner peripheral wall surface of the main body 211. The conductive element 22 is screwed to a lower end of the threaded hollow post 214 with a screw 23, and is stopped by the post 213 from contacting with the inner peripheral wall surface of the main body 211. The conductive element 22 is stamped to form at a bottom center with a locating recess 221.

Figure 2:
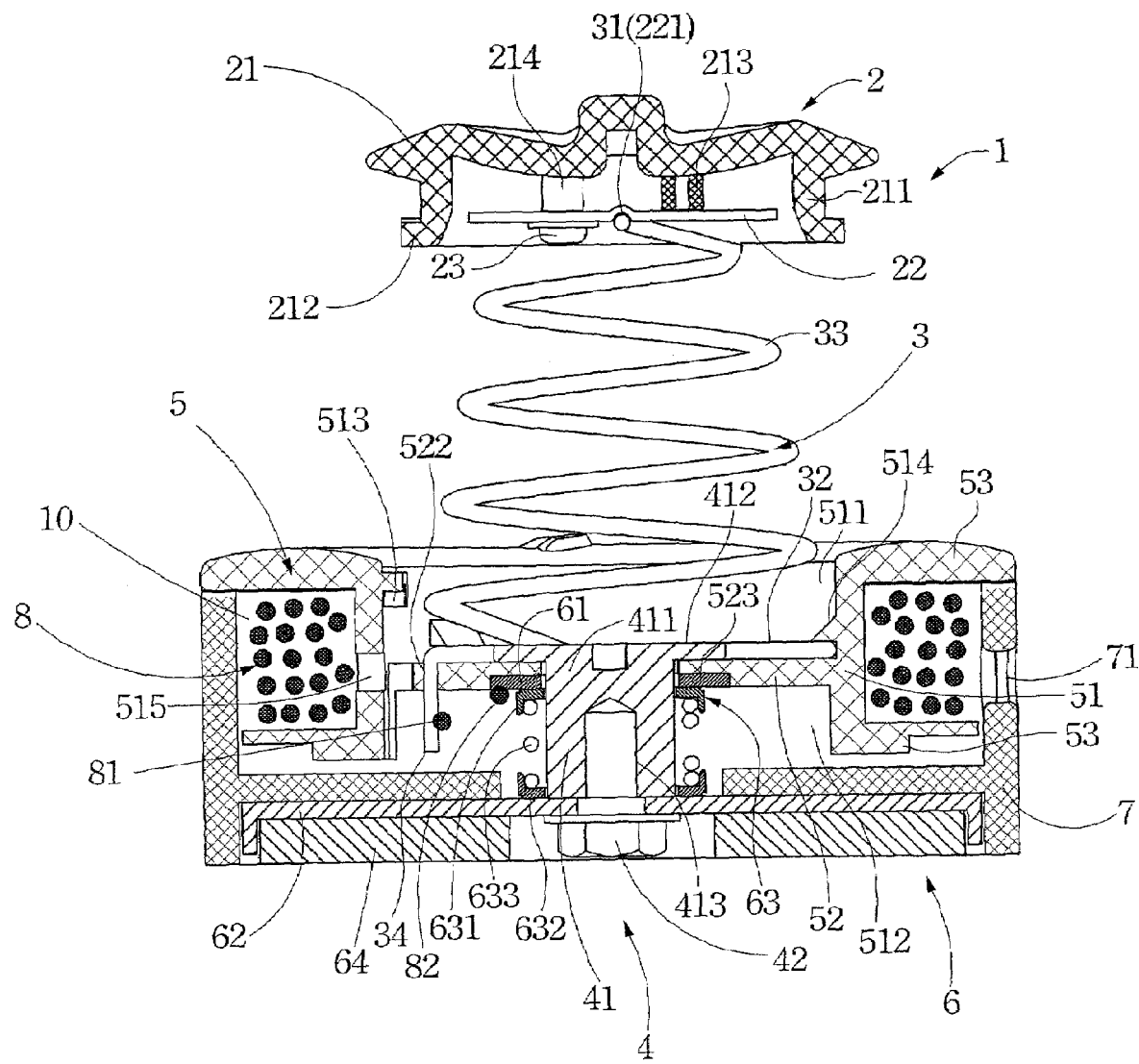
FIG. 2 is an assembled sectional view of the signal receiving mechanism of FIG. 1 with a top unit thereof located at an elevated position above a cord reel.

Please also refer to FIG. 2, which is an assembled sectional view showing the top unit 2 is in an elevated position above the cord reel 5.

The retaining catches 212 at the lower outer surface of the top cover 21 are detachably hooked to corresponding retaining holes 513 by interference fit. When the retaining catches 212 are hooked to the corresponding retaining holes 513, the top unit 2 is in a lowered position to be held to the top of the cord reel 5 and partially received in the upper part 511 of the hollow tubular body 51, as can be seen from FIG. 4. When the top unit 2 is turned by a predetermined angle to separate the retaining catches 212 from the corresponding retaining holes 513, the top unit 2 is not interfered with the cord reel 5, as can be seen from FIG. 2. Due to limited drawing angle, not all the retaining catches 212 and the retaining holes 513 can be shown on the drawings. However, both the retaining catches 212 and the retaining holes 513 are annularly arranged and properly spaced by, for example, 90 degrees, along the inner wall surface of the hollow tubular body 51. Of course, the number and position of the retaining catches 212 and the corresponding retaining holes 513 are not limited to that shown in the illustrated preferred embodiment, but may be adjusted depending on actual need.

In the present invention, the signal receiving element 3 is configured as a coil spring, and integrally includes a locating section 31, a setting section 32, a signal receiving section 33 extended between the locating section 31 and the setting section 32, and a contact section 34 extended from the setting section 32 to locate opposite to the signal receiving section 33. The locating section 31 is fixedly connected at an outer end to the locating recess 221 below the conductive element 22 of the top unit 2; the signal receiving section 33 is sandwiched between the top cover 21 of the top unit 2 and the inner annular section 52 of the cord reel 5; and the setting section 32 is fixedly set in a space defined between the protrusions 514 in the hollow tubular body 51 and the inner annular section 52. The contact section is downward extended through the passage 522 formed on the inner annular section 52 into the lower part 512 of hollow tubular body 51.

The signal receiving element 3 normally pushes the top unit 2 away from the cord reel 5. When the top unit 2 is in the lowered position to be partially received in the upper part 511 of the cord reel 5, the signal receiving element 3 is compressed by the top unit 2 to be received between the top unit 2 and the cord reel 5, as shown in FIG. 4. At this point, the signal receiving element 3 is in a tension or compressed state to generate a restoring force. When the retaining catches 212 of the top unit 2 are detached from the corresponding retaining holes 513 on the cord reel 5, the top unit 2 is no longer interfered by the cord reel 5, and is pushed by the signal receiving element 3 in a direction away from the cord reel 5, as shown in FIG. 2. At this point, the signal receiving element 3 is in an extended state. By compressing or extending the signal receiving element 3, a receiving frequency of the signal receiving element 3 may be adjusted. When the signal receiving mechanism 1 is not in use, the signal receiving element 3 is compressed between the top unit 2 and the cord reel 5, so that the signal receiving mechanism 1 is maintained in an integral and compact configuration with a reduced volume to facilitate easy storage or carrying thereof.

The hollow base 7 has a substantially H-shaped vertical section passing the axis X, and is located around the cord reel 5, so that the hollow tubular body 51 and the two outer annular sections 53 of the cord reel 5 and the hollow base 7 together define a cord winding space 10 between them. The hollow base 7 is provided on a peripheral wall thereof between the two outer annular sections 53 of the cord reel 5 with a cord passage 71 to communicate the cord winding space 10 with external environment.

The grounding unit 6 includes a first annular conductive plate 61, a second annular conductive plate 62, a conduction module 63 located between the first and the second conductive plate 61, 62, and a seat 64 located below the second annular conductive plate 62. The conduction module 63 includes an upper annular limiting wall 631 that is in contact with the first annular conductive plate 61, a lower annular limiting wall 632 that is in contact with the second annular conductive plate 62, and an elastic element 633 located between the upper and the lower annular limiting wall 631, 632. In the illustrated preferred embodiment, the elastic element 633 is a coil spring having two ends that separately normally push against the upper and the lower annular limiting wall 631, 632 for them to effective contact with the first and the second annular conductive plate 61, 62, respectively, so as to ensure that the first annular conductive plate 61 is electrically connected to the second annular conductive plate 62.

The first annular conductive plate 61 is set in the annular rabbet 523 formed at the underside of the inner annular section 52. The conduction module 63 is located between the cord reel 5 and the hollow base 7. The second annular conductive plate 62 and the seat 64 are sequentially located below the hollow base 7. The seat 64 may be made of a magnetic material, so that the whole signal receiving mechanism 1 may be firmly magnetically attached at the magnetic seat 64 to a metallic object, such as a car (not shown).

The pivot unit 4 includes a first pivotal element 41 and a second pivotal element 42 that may be correspondingly fastened together. In the illustrated preferred embodiment, the first pivotal element 41 mainly serves as a nut while the second pivotal element 42 is configured as a bolt. The first pivotal element 41 includes a shaft portion 411, a radially extended stop flange 412 around atop of the shaft portion 411, and an internally threaded space 413 extended from a bottom toward the top of the shaft portion 411 for the second pivotal element 42 to correspondingly screw thereinto.

The stop flange 412 of the first pivotal element 41 has an underside pressed against an upper side of the inner annular section 52 of the cord reel 5, with the shaft portion 411 downward extended through central openings of the inner annular section 52, the first annular conductive plate 61, the conduction module 63, and the hollow base 7. The second pivotal element 42 is upward extended through the seat 64 and the second annular conductive plate 62 to firmly screw into the threaded space 413 of the first pivotal element 41.

Via the pivot unit 4, the cord reel 5 is rotatably connected to the grounding unit 6, such that the first annular conductive plate 61 and the cord reel 5 may be rotated at the same time about the axis X relative to the conduction module 63 and the second annular conductive plate 62.

In the illustrated preferred embodiment, the cord 8 includes a first wire 81 and a second wire 82 that are different in the electric polarity. The cord 8 is wound around the hollow tubular body 51, and located in the cord winding space 10 defined by the hollow tubular body 51, the two outer annular sections 53, and the hollow base 7. An outer end of the cord 8 is provided with a connecting terminal (not shown) and is extended through the cord passage 71 formed on the hollow base 7, so as to electrically connected to the electronic apparatus via the connecting terminal. An inner end of the cord 8 is extended through the through opening 515 formed on the cord reel 5 into the lower part 512 of the hollow tubular body 51. The inner end of the cord 8 located in the lower part 512 of the hollow tubular body 51 is bared, so that the first wire 81 and the second wire 82 at the bared inner end of the cord 8 are electrically connected to the downward extended contact section 34 of the signal receiving element 3 and the first annular conductive plate 61 of the grounding unit 6, respectively.

When it is desired to use the signal receiving mechanism 1 to rewind or pull the cord 8, first hook the top unit 2 to the top of the cord reel 5, and then turn the top cover 21 of the top unit 2 in a predetermined direction. At this point, the top cover 21 would bring the cord reel 5 and the first annular conductive plate 61 to synchronously rotate relative to the conduction module 63.

Since the first annular conductive plate 61 is only in contact with the conduction module 63 without being fixedly connected to the latter, and since the first annular conductive plate 61 and the signal receiving element 3 are synchronously rotated along with the cord reel 5, the portion of the cord 8 located in the lower part 512 of the cord reel 5 is rotated at the same time. Therefore, the cord 8 would not become tangled when it is rewound around or pulled out of the cord reel 5.

When a user stops turning the top unit 2 when the cord 8 has been pulled out to a desired length, the cord 8 is held to the extended position by an elastic force of the elastic element 633 that pushes the conduction module 63 against the inner annular section 51 of the cord reel 5 to prevent the cord reel 5 from turning. The signal receiving element 3 has a receiving frequency and receiving quality that is adjusted according to the length of the cord 8 that is pulled out of the cord reel 5. When the signal receiving mechanism 1 of the present invention is not in use, the top unit 2 is turned reversely to retract the cord 8 into the cord winding space 10. Then, the whole signal receiving mechanism 1 may be removed from the electronic apparatus. The independent signal receiving mechanism 1 is in the form of a flat cylindrical box that enables easy storage and carrying.

In conclusion, the signal receiving mechanism 1 of the present invention uses the pivot unit 4 to rotatably connect the cord reel 5 to the grounding unit 6, and uses the contact of the conduction module 63 with the first annular conductive plate 61 to enable electric connection between them. Therefore, when the cord reel 5 and the first annular conductive plate 61 are rotated about the axis X at the same time, the cord 8 is brought to rotate at the same time to avoid any tangle of the cord 8. Moreover, the signal receiving mechanism 1 of the present invention further uses the detachable interference fit of the top unit 2 in the cord reel 5 to compress or extend the signal receiving element 3 and accordingly, adjust the receiving frequency of the signal receiving element 3. Thus, the signal receiving mechanism 1 of the present invention is very convenient and practical for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A signal receiving mechanism, comprising:
   a cord reel including an axially extended hollow tubular body and an inner annular section horizontally located around an inner wall surface of said hollow tubular body; said hollow tubular body being provided on a wall thereof lower than said inner annular section with a horizontally extended through opening, and said inner annular section being formed at a predetermined position with a passage that vertically extends through the inner annular section;
   a cord including a first wire and a second wire that are different in an electric polarity thereof, and at least part of said cord being wound around said hollow tubular body with an inner end of said cord extended through said through opening on said cord reel into a space of said cord reel below said inner annular section;
   a signal receiving element being assembled to said hollow tubular body of said cord reel to locate in a space above said inner annular section; a lower end of said signal receiving element being downward extended through said passage on said inner annular section into the space of said cord reel below said inner annular section, so as to electrically connect to said first wire at the inner end of said cord;
   a grounding unit including a first annular conductive plate and a conduction module that are in contact with each other; said first annular conductive plate being set at an underside of said inner annular section of said cord reel to electrically connect to said second wire at the inner end of said cord; and
   a pivot unit for rotatably connecting said cord reel to said grounding unit, such that said first annular conductive plate along with said cord reel and said cord may be rotated relative to said conduction module at the same time.

2. The signal receiving mechanism as claimed in claim 1, wherein said signal receiving element includes a signal receiving section, a setting section outward extended from a lower end of said signal receiving section, and a contact section extended from an outer end of said setting section to form the lower end of said signal receiving element; said setting section being fixedly set in a space defined in said cord reel above said inner annular section, and said contact section being downward extended through said passage on said inner annular section to electrically connect to said first wire at the inner end of said cord.

3. The signal receiving mechanism as claimed in claim 1, further comprising a top unit; and wherein said signal receiving element includes a locating section, a setting section, a coiled signal receiving section extended between said locating section and said setting section, and a contact section extended from said setting section to locate opposite to said signal receiving section to form the lower end of said signal receiving element; said setting section being fixedly set in a space defined in said cord reel above said inner annular section, and said contact section being downward extended through said passage on said inner annular section to electrically connect to said first wire at the inner end of said cord; and wherein said hollow tubular body includes at least one retaining hole formed on an inner wall surface thereof above said inner annular section; and wherein said top unit is connected at a predetermined point to an upper end of said locating section of said signal receiving element, so that said signal receiving section of said signal receiving element is sandwiched between said top unit and said cord reel; and wherein said top unit includes at least one retaining catch being detachably hooked to said at least one retaining hole on said hollow tubular body by interference fit.

4. The signal receiving mechanism as claimed in claim 1, wherein said signal receiving element is a coil spring.

5. The signal receiving mechanism as claimed in claim 2, wherein said hollow tubular body is provided on an inner wall surface above said inner annular section with at least one protrusion, and said setting section of said signal receiving element is fixedly set in a space defined between said at least one protrusion and said inner annular section.

6. The signal receiving mechanism as claimed in claim 3, wherein said hollow tubular body is provided on an inner wall surface above said inner annular section with at least one protrusion, and said setting section of said signal receiving element is fixedly set in a space defined between said at least one protrusion and said inner annular section.

7. The signal receiving mechanism as claimed in claim 1, wherein said inner annular section is formed at the underside with an annular rabbet, and said first annular conductive plate being set in said annular rabbet.

8. The signal receiving mechanism as claimed in claim 3, wherein said inner annular section is formed at the underside with an annular rabbet, and said first annular conductive plate being set in said annular rabbet.

9. The signal receiving mechanism as claimed in claim 1, wherein said conduction module includes an upper annular limiting wall that is in contact with said first annular conductive plate, a lower annular limiting wall for grounding, and an elastic element located between said upper and said lower annular limiting wall.

10. The signal receiving mechanism as claimed in claim 3, wherein said conduction module includes an upper annular limiting wall that is in contact with said first annular conductive plate, a lower annular limiting wall for grounding, and an elastic element located between said upper and said lower annular limiting wall.

11. The signal receiving mechanism as claimed in claim 1, wherein said cord reel further includes two outer annular sections separately horizontally located around an upper and a lower outer wall surface of said hollow tubular body to space from each other.

12. The signal receiving mechanism as claimed in claim 3, wherein said cord reel further includes two outer annular sections separately horizontally located around an upper and a lower outer wall surface of said hollow tubular body to space from each other.

13. The signal receiving mechanism as claimed in claim 11, further comprising a hollow base located around said cord reel, so that said cord reel and said hollow base together define a cord winding space therebetween; said hollow base being provided on a peripheral wall thereof between said two outer annular sections of said cord reel with a cord passage to communicate said cord winding space with external environment for said cord to extend therethrough.

14. The signal receiving mechanism as claimed in claim 12, further comprising a hollow base located around said cord reel, so that said cord reel and said hollow base together define a cord winding space therebetween; said hollow base being provided on a peripheral wall thereof between said two outer annular sections of said cord reel with a cord passage to communicate said cord winding space with external environment for said cord to extend therethrough.

15. The signal receiving mechanism as claimed in claim 13, wherein said grounding unit further includes a second annular conductive plate that is located below said hollow base to connect to said pivot unit for grounding; and wherein said conduction module includes an upper annular limiting wall that is in contact with said first annular conductive plate, a lower annular limiting wall that is in contact with said second annular conductive plate, and an elastic element located between said upper and said lower annular limiting wall to normally push against said upper and lower annular limiting walls, so that said upper and said lower annular limiting wall are in effective contact with said first and said second annular conductive plate, respectively.

16. The signal receiving mechanism as claimed in claim 14, wherein said grounding unit further includes a second annular conductive plate that is located below said hollow base to connect to said pivot unit for grounding; and wherein said conduction module includes an upper annular limiting wall that is in contact with said first annular conductive plate, a lower annular limiting wall that is in contact with said second annular conductive plate, and an elastic element located between said upper and said lower annular limiting wall to normally push against said upper and lower annular limiting walls, so that said upper and said lower annular limiting wall are in effective contact with said first and said second annular conductive plate, respectively.

17. The signal receiving mechanism as claimed in claim 15, wherein said grounding unit further includes a seat located below said second annular conductive plate.

18. The signal receiving mechanism as claimed in claim 16, wherein said grounding unit further includes a seat located below said second annular conductive plate.

19. The signal receiving mechanism as claimed in claim 17, wherein said seat is a magnetic seat.

20. The signal receiving mechanism as claimed in claim 18, wherein said seat is a magnetic seat.

* * * * *